United States Patent
Volatier et al.

(10) Patent No.: US 9,844,297 B2
(45) Date of Patent: Dec. 19, 2017

(54) COOKING APPLIANCE AND METHOD FOR IMPLEMENTING SAME

(71) Applicant: SEB S.A., Ecully (FR)

(72) Inventors: Sebastien Volatier, Dijon (FR); Joel Lecerf, Periers (FR)

(73) Assignee: SEB S.A., Ecully (FR)

( * ) Notice: Subject to any disclaimer, the term of this patent is extended or adjusted under 35 U.S.C. 154(b) by 421 days.

(21) Appl. No.: 14/407,240

(22) PCT Filed: Jun. 12, 2013

(86) PCT No.: PCT/FR2013/051365
§ 371 (c)(1),
(2) Date: Dec. 11, 2014

(87) PCT Pub. No.: WO2013/186487
PCT Pub. Date: Dec. 19, 2013

(65) Prior Publication Data
US 2015/0122135 A1    May 7, 2015

(30) Foreign Application Priority Data

Jun. 15, 2012  (FR) ...................................... 12 55600

(51) Int. Cl.
*A47J 37/06* (2006.01)

(52) U.S. Cl.
CPC .... *A47J 37/0611* (2013.01); *A47J 2037/0617* (2013.01); *Y10T 29/49002* (2015.01)

(58) Field of Classification Search
CPC ............ A47J 3037/0617; A47J 37/0611; A47J 2037/0617

USPC .......................... 99/379, 372, 378, 376, 375
See application file for complete search history.

(56) References Cited

U.S. PATENT DOCUMENTS

| | | | | |
|---|---|---|---|---|
| 4,088,067 | A | * | 5/1978 | Kaebitzsch .......... A47J 37/0611 99/379 |
| 4,913,040 | A | * | 4/1990 | Sherman .............. A47J 37/0611 99/349 |
| 5,642,658 | A | * | 7/1997 | Liebermann ......... A47J 37/0611 100/324 |
| 2010/0116146 | A1 | | 5/2010 | Xie |

FOREIGN PATENT DOCUMENTS

| | | |
|---|---|---|
| AU | 2009201010 A1 | 10/2009 |
| CA | 2674498 A1 | 6/2010 |
| DE | 4302190 A1 | 7/1994 |
| WO | 2007/140547 A1 | 12/2007 |

\* cited by examiner

*Primary Examiner* — Reginald L Alexander
(74) *Attorney, Agent, or Firm* — The Webb Law Firm

(57) ABSTRACT

Provided is a cooking appliance comprising a first structure having a hot plate for cooking food, and a measuring device for measuring the thickness of the food arranged thereon and comprising a pivoting rocker connected to a pivotable shaft by a first end thereof, and a means for measuring the pivoting angle of the rocker in order to estimate the thickness of the food. The appliance comprises a second mobile structure which, when moved away from the first structure, generates a pivoting of said shaft in relation to the first structure, causing the pivoting of the rocker, and the measuring means interacts with the rocker towards a second end thereof.

15 Claims, 5 Drawing Sheets

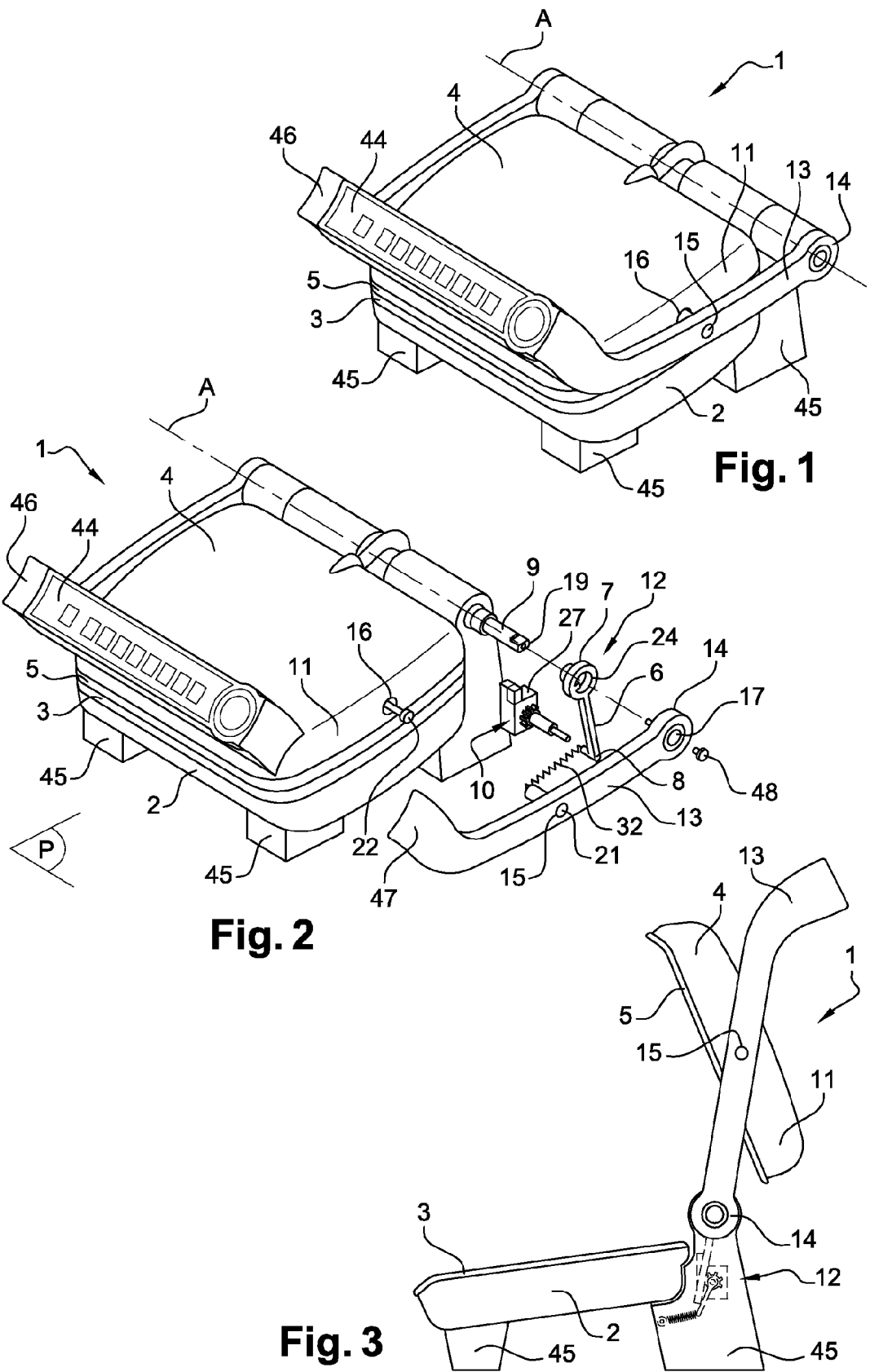

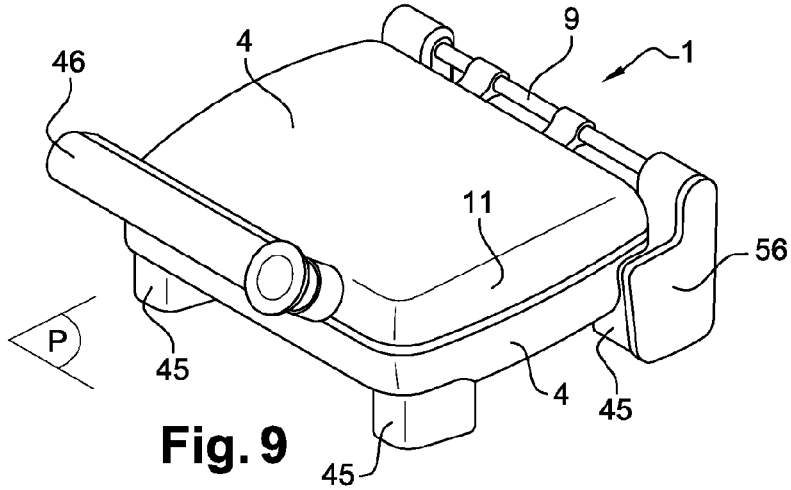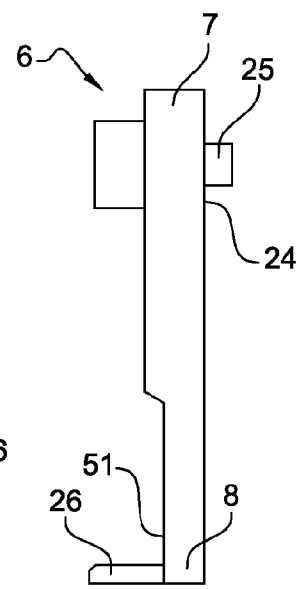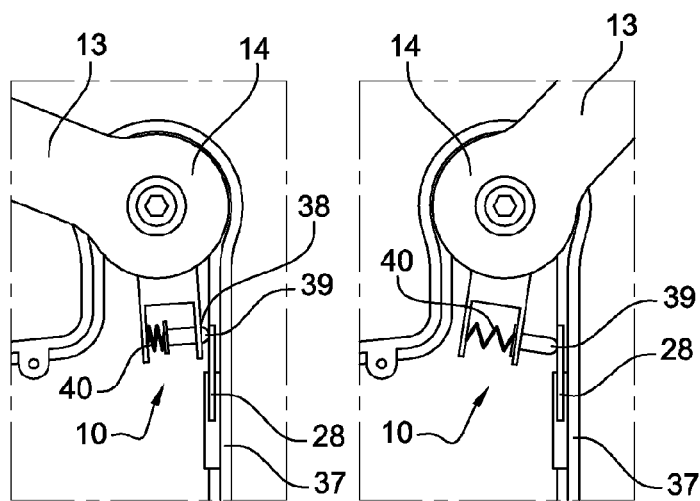

COOKING APPLIANCE AND METHOD FOR IMPLEMENTING SAME

CROSS-REFERENCE TO RELATED APPLICATIONS

This application is the United States national phase of International Application No. PCT/FR2013/051365 filed Jun. 12, 2013, and claims priority to French Patent Application No. 1255600 filed Jun. 15, 2012, the disclosures of which are hereby incorporated in their entirety by reference.

The invention concerns a cooking appliance for cooking a food and a method for implementing the same.

FIELD OF THE INVENTION

The present invention concerns the field of cooking appliances comprising at least one heating plate for cooking a food such as, meat, fish, vegetables or others. More precisely, the invention concerns a cooking appliance allowing to determine the thickness of foods contained in the appliance.

PRIOR ART

A food cooking appliance of this type is known from document DE 4 302 190. The latter describes a cooking appliance comprising a first structure including a heating plate for cooking a food and a measuring device for measuring the thickness of the food in the appliance. The measuring device is equipped with two pivoting rockers, each connected by a first end to a pivotable shaft. The measuring device also comprises a means for measuring the pivoting angle of the rocker to estimate the thickness of the food.

However, this appliance does not allow estimating very reliably the thickness of the food and is not easy to use.

OBJECTIVES OF THE INVENTION

The invention aims in particular to overcome all or part of the drawbacks of the prior art.

More precisely, an objective of the invention is to provide a cooking appliance allowing to determine the thickness of foods in order to control and obtain an automatic cooking of foods.

The invention further aims to guarantee the quality of food, in particular the organoleptic quality, since the cooking time will depend, among others, on the thickness.

SUMMARY OF THE INVENTION

These objectives are achieved by means of a cooking appliance comprising a first structure comprising a heating plate for cooking a food and a measuring device for measuring the thickness of the food thus disposed and comprising:
  a pivoting rocker connected by a first end to a pivotable shaft; and,
  a means for measuring the pivoting angle of the rocker to estimate the thickness of the food.

The invention is remarkable in that the appliance comprises a second movable structure, of which a separation movement relative to the first structure generates a pivoting of said shaft relative to the first structure, resulting in the pivoting of the rocker, and the measuring means interacts with the rocker toward a second end thereof.

Thus, the second movable structure allows an adaptability of the appliance to the thickness of the food, and the existing distance then between the two structures allows determining very reliably the thickness of the food. Preferably, the first structure will cook thereagainst the food.

According to an important feature, the second structure comprises a heating plate adapted to cook thereagainst, by conduction, said food disposed between the plates.

Accordingly, the food can be cooked uniformly and more quickly since the two sides of the food are in contact with the heating plates.

According to one embodiment, the rocker is rigidly connected to the pivotable shaft or is mounted on the shaft with a clearance sufficient to allow the pivoting of the rocker about the shaft. All scenarios for allowing a pivoting of the rocker are considered so that the mounting is simple.

Advantageously, the second structure is mounted on the shaft by means of lateral arms movable at least relative to the first structure.

This arrangement allows facilitating the mounting and a time saving during manufacturing.

Preferably, each lateral arm comprises a first end connected to the shaft and a second portion connected to a flank of the second structure toward the middle thereof.

The arm thus arranged allows an average measurement of the food and the management of the lack of parallelism between the two structures.

According to another important feature, the rocker includes a first end engaged with a first end of one of the lateral arms where the arm is connected to the shaft, this engagement operating until a predetermined pivoting angle of the arms beyond which said arm disengages from the rocker, so that the lateral arms then continue their pivoting without the rocker continuing to pivot.

This arrangement, on the one hand, allows increasing the resolution of the measurements over a range approximately corresponding to a food thickness, and on the other hand, allows the second structure to open without continuously biasing the measuring means.

Advantageously, the predetermined pivoting angle of the arms corresponds to the predetermined pivoting angle of the rocker which is comprised between 10° and 30°.

According to another advantageous feature, the predetermined pivoting angle of the rocker corresponds to an intermediate open state of the first and second structures where they are substantially parallel.

According to an important feature, the rocker is connected, toward its second end, to a means for actuating the measuring means. This arrangement allows the rocker to easily actuate the measuring means, thereby giving an image of the angle covered at the arm and therefore an accurate information about the separation of the structures and thus the thickness of the food.

According to a preferred embodiment, the measuring means comprises a potentiometer.

The use of a potentiometer is a simple, very cost-effective and easy mountable solution.

Advantageously, the rocker comprises a first and a second fingers, the actuating means for actuating the measuring means forms a lever driven by the second finger and biased by a biasing means which holds the rocker and the lever in contact during the separation movement of the second structure. The use of a lever allows the rocker to drive the measuring means upon the opening of the second structure. In addition, the biasing means allows reducing the construction clearances.

According to another embodiment, the actuating means comprises a toothed wheel driven by a rack of the rocker and biased by a biasing means which holds the rocker and the toothed wheel in contact during the separation movement of the second structure.

According to another embodiment, the measuring means comprises a strain gauge. The use of a strain gauge is a solution that is also simple and applicable on the appliance such as aforementioned and not requiring its modification.

According to another embodiment and for simplicity, the measuring means comprises an optical detection system with a photodetector.

The invention also concerns a method for implementing a food cooking appliance. This method comprises a step of adjusting the appliance, before use, through the selection by a user of a key or a combination of keys that the appliance comprises.

Thus, all errors and uncertainties due to the repeated use and to the wear of the parts are compensated.

BRIEF DESCRIPTION OF THE DRAWINGS

Other features and advantages of the invention will become apparent from the description which is given therefrom hereinafter, by way of indication and without limitation, with reference to the appended drawings, in which:

FIG. 1 is a perspective view of the cooking appliance according to the invention;

FIG. 2 is an exploded view of the appliance according to the invention;

FIG. 3 is a side view of the open appliance;

FIG. 7 represents an internal view of an arm of the appliance;

FIG. 8 is a side view of the rocker;

FIG. 9 represents a perspective view of the appliance according to another embodiment;

FIGS. 10A, 10B and 11 are schematic representations of other embodiments of the measuring device according to the invention;

DETAILED DESCRIPTION OF THE INVENTION

Figure 4:
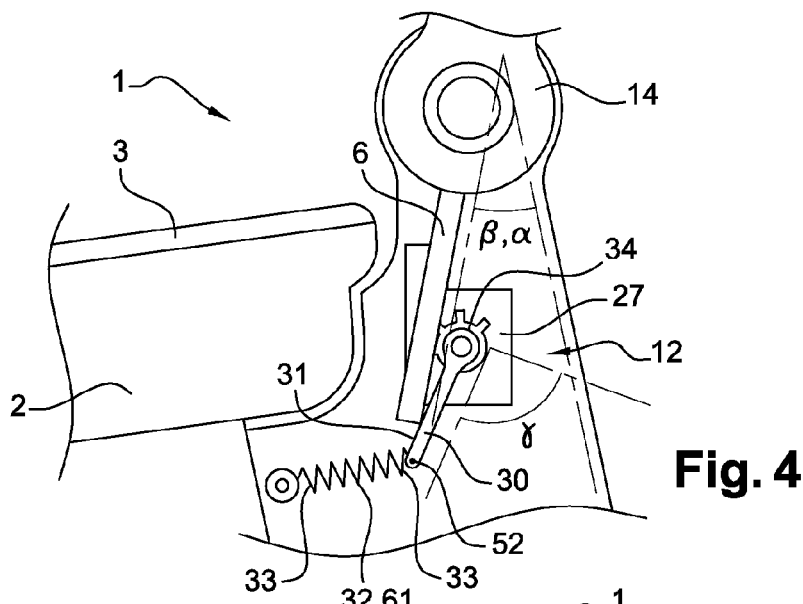
FIG. 4 is a detailed view of the measuring device mounted on the appliance according to FIG. 2.
Figure 5:
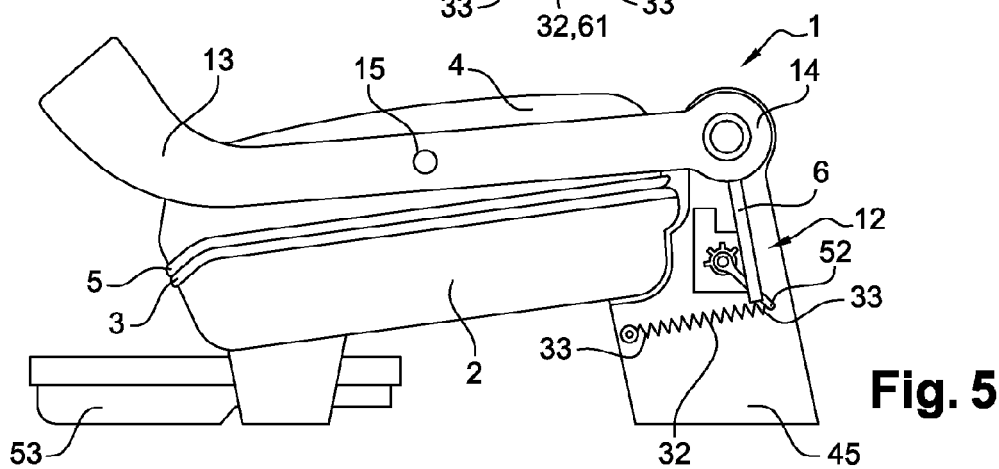
FIG. 5 is a side view of the closed appliance.
Figure 6:
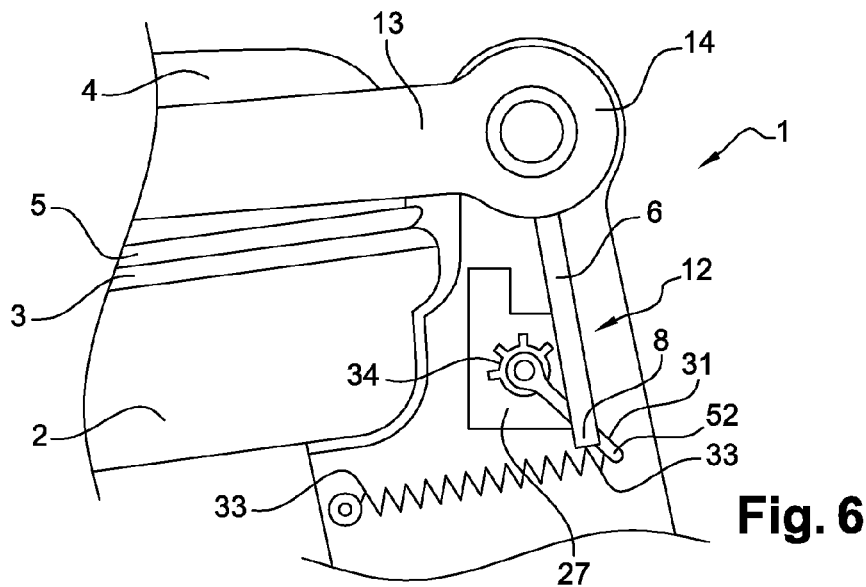
FIG. 6 is a detailed view of the measuring device mounted on the appliance according to FIG. 4.

FIG. 1 illustrates a household appliance 1 comprising a first structure 2 which includes a lower heating plate 3, for cooking a food and a measuring device 12 for measuring the thickness of the food placed in the appliance 1.

The food(s) can be meat, fish, vegetables, or others.

The measuring device 12 represented in FIGS. 2 to 6, 8, and 10A, 10B to 19 comprises a rocker 6 pivotable in the appliance 1. The rocker 6 exhibits a first 7 and a second 8 ends, the first end 7 being connected to a shaft 9 pivotable about an axis of rotation A.

The rocker 6 can be rigidly connected to the shaft 9, for example by being tightly mounted around it. Thus, when the shaft 9 pivots or rotates, it also drives the rocker 6 in rotation. It can be also provided that the rocker 6 is mounted on the shaft 9 with a clearance sufficient to allow the rotation or the pivoting of the rocker. Unlike the alternative with the rigidly mounted rocker, when the shaft 9 rotates, the rocker pivots through other means connected to the shaft 9 which will be described later in the description.

The measuring device 12 also comprises a means 10 for measuring the pivoting angle of the rocker 6 allowing to estimate the thickness of the food which is described hereinafter.

It is provided that the appliance 1 is equipped with a second structure 4 movable relative to the first structure 2 to produce a separation movement.

The second structure 4 also comprises an upper heating plate 5, which is adapted to cook thereagainst, by conduction, the food(s) disposed between the lower 3 and upper 5 heating plates. More precisely, the food is cooked against the two heating plates 3, 5.

In one alternative, it can be considered that the second structure 4 consists of a lid for example, for covering the first structure 2.

Each structure 2, 4 is formed, for example, of a shell and comprises lateral flanks 11. The shell can be made of a metal or a polymer, for example. The second structure 4 can comprise on its shell a handle 46, preferably made of thermoplastic and insulating, to allow the opening and the closing of the appliance 1. The first structure 2 can comprise feet 45 for the positioning of the appliance 1 on a flat support, for example. The feet 45 can be formed by molding with the shell of the second structure 4 or fixed on the shell with screws, or other adequate means. The foot 45 is covered with a wall 56. A collection tray 53 of cooking juice can also be provided.

The first 2 and second 4 structures exhibit a closed state in which they each extend along a plane P substantially horizontal and parallel relative to each other, and an open state in which they form, for example, a substantially dihedral shape with a separation angle of about 100° (when the second structure 4 is rigidly fixed to the shaft 9, FIG. 9). Thus, the food to be cooked will be disposed horizontally between the lower 3 and upper 5 heating plates.

Each heating plate 3, 5 is heated by an electrical resistance (not represented) supplying them with the energy required for cooking the food. The electrical resistance is generally located between the shell and the heating plates 3, 5. Preferably, the heating plates 3, 5 are removable and can be coated with a non-stick coating.

According to the invention, the separation movement of the second structure 4 relative to the first structure 2 generates a rotation of the shaft 9 relative to the first structure 2, thereby resulting in the pivoting of the rocker 6. In the case where the rocker 6 is rigidly fixed on the shaft 9, the pivoting of the shaft 9 causes the pivoting of the rocker 6. The measuring means 10 can interact with the rocker toward the second end 8 of the rocker 6.

The second structure 4 can be mounted on the shaft 9 by means of lateral arms 13 (FIG. 7) movable relative, at least, to the first structure 2. More precisely, each lateral arm 13 comprises a first end 14 connected to the shaft 9 and a second portion 15 connected toward the middle 16 of a flank 11 of the second structure 4. The second portion 15 can be formed by a second end 47 of the arm 13. In this present embodiment, this second end 47 is secured to the handle 46.

Figure 12:
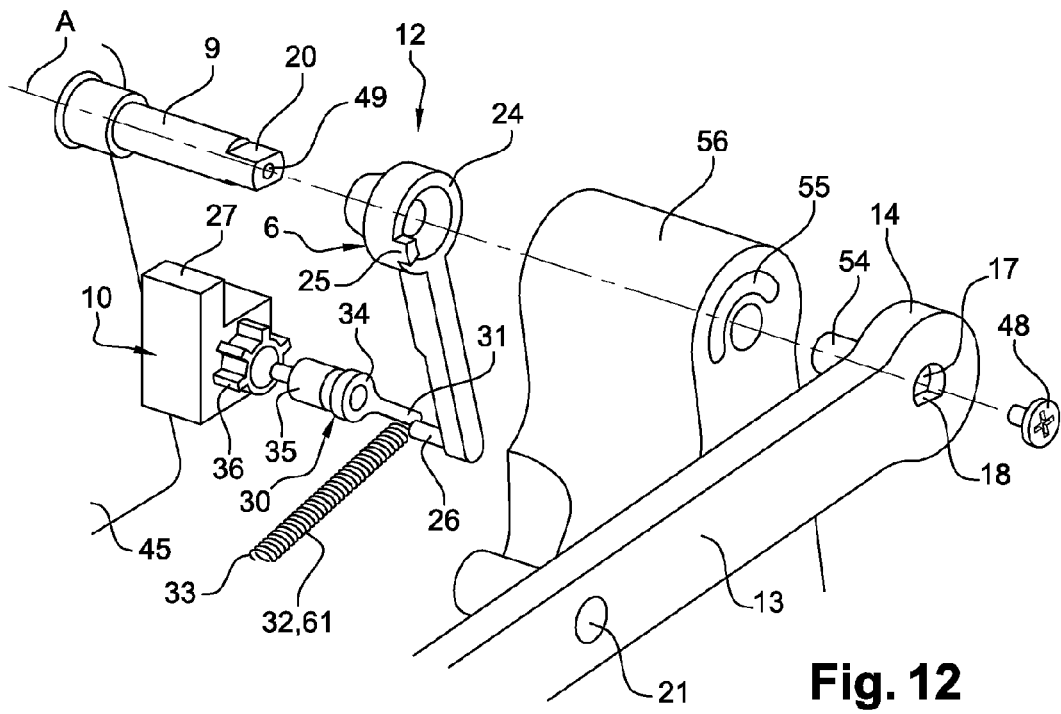
FIG. 12 shows in a more detailed way the measuring device according to the invention.
Figure 13:
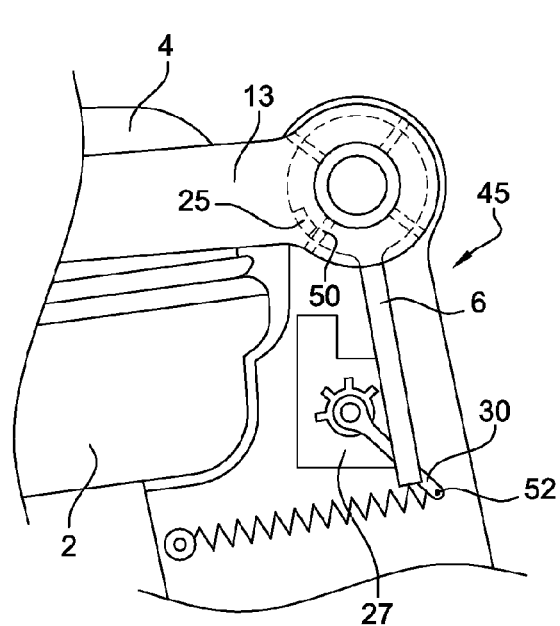
FIGS. 13 and 14 represent the engagement means of the rocker and the arm.
Figure 14:
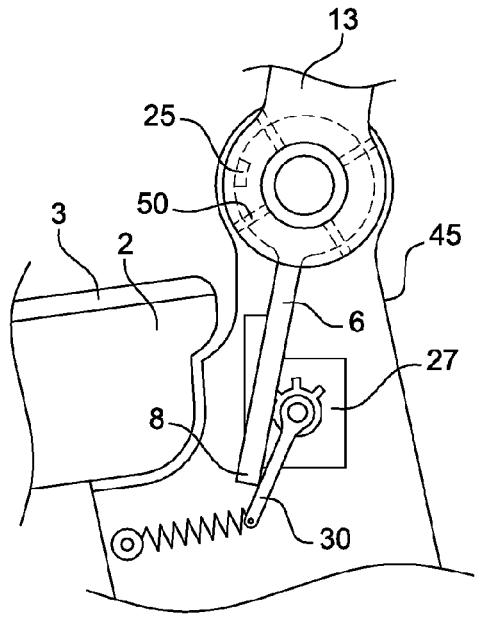
Figure 15:
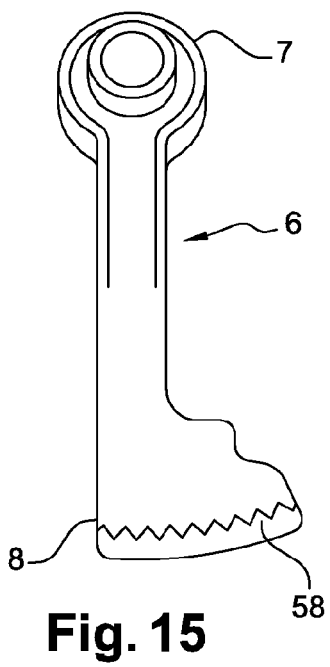
FIG. 15 illustrates an alternative of the rocker.
Figure 16:
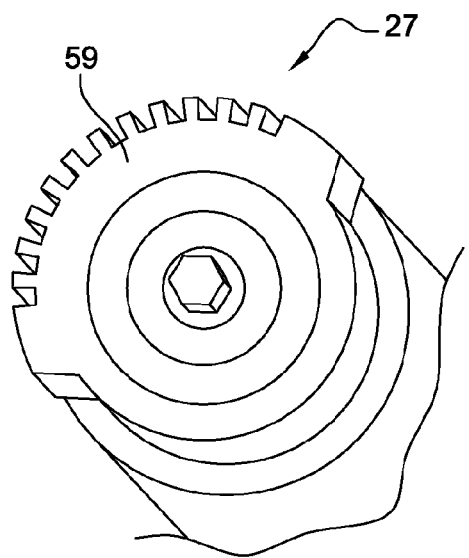
FIG. 16 is a detailed view of a portion of the potentiometer.
Figure 17:
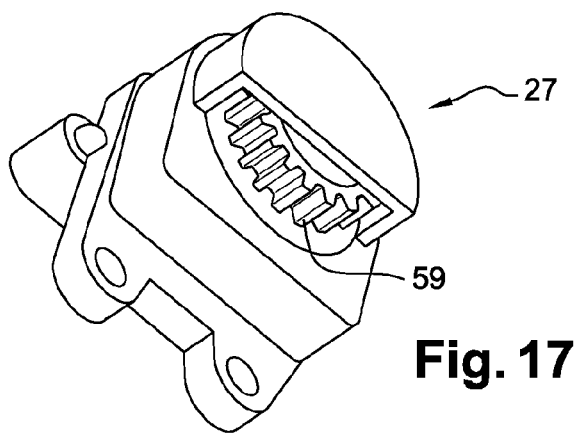
FIG. 17 is a perspective view of another alternative of the potentiometer according to FIG. 16.
Figure 18:
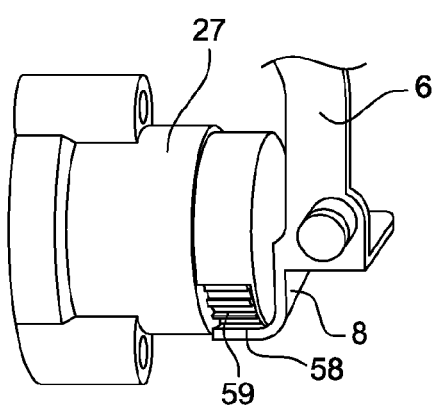
FIG. 18 is a detailed view of another embodiment of the measuring means.
Figure 19:
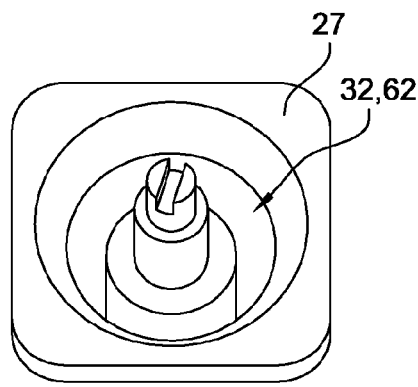
FIG. 19 illustrates a portion of the potentiometer.

More precisely, the first end 14 of the lateral arms 13, as can be seen in FIG. 12, includes an opening 17 with an inner surface fitted with flat sections 18, here two flat sections, intended to cooperate with the end 19 of the shaft 9 which also includes a flat section 20 in order to create a fixed connection between the shaft 9 and the arms 13. The assembly can be tightened further by a screw 48 through the opening 17 of the arm 13 and an opening 49. To facilitate the guiding of the arm, the wall 56 covering the foot 45 can exhibit a groove 55 in which a pin 54 slides. The second portion 15 of the arms 13 includes an opening 21 for the passage of a screw 22, for example, which will be screwed at the middle 16 of the flank 11 of the second structure 4. The latter can be fixed relative to the arm 13 or preferably movable in rotation through a pivot connection created by the screw 22 and the opening 21. A pivot connection will allow an adjusting of the second structure 4 in a manner substantially parallel to the first 2 one so that the cooking of the food is uniform. However, the mobility of the second structure 4 relative to the arm 13 can be blocked thanks to a female member, of the trunnion type, mounted on the shell of the structure 4 cooperating with a male member, of the notch type, provided on the inner face of the arm 13, suitable to define a connection via obstacle.

In an alternative of the appliance 1 schematized in FIG. 9, it can be considered that the latter has no arms 13. In this case, it is the movement of the second structure 4 which is tightly and rigidly mounted with the shaft 9 which causes the pivoting of the rocker 6.

As previously seen, the rocker 6 can be rigidly connected to the shaft 9. For this, the first end 7 of the rocker 6 includes an orifice 23 whose the inner surface can be fitted with a flat section (not represented) facing the flat section 20 of the shaft 9 to create a fixed connection. However, the rocker 6 can be tightly mounted through the fastening of the arm 13 on the shaft 9. Accordingly, by pivoting the lateral arms 13 and/or the second structure 4 to open the appliance 1, the shaft 9 is driven in rotation, thereby simultaneously driving the rocker 6 in rotation.

The rocker 6 exhibits a length of about 100 mm. The latter can, for example, be made of plastic, metal, or another material.

The first end 7 of the rocker 6 can be engaged with the first end 14 of one of the lateral arms 13 where the rocker 6 is connected to the shaft. The engagement between the rocker 6 and the arm 13 is obtained by means of a first finger 25 located on the outer face 24 of the first end 7 of the rocker 6. The first finger 25 allows a rear portion 50 of the arm 13 to bear thereon during the displacement of the arm 13. For example, this engagement operates until a predetermined pivoting angle α of the arm 13 (see FIG. 4), the latter disengaging then from the rocker 6 beyond said predetermined angle α, so that the lateral arms 13 then continue their pivoting, toward a fully-open position of the arms 13 and/or the first 2 and second 4 structures, and without the rocker 6 continuing to pivot.

In the case where the rocker 6 is mounted with a clearance on the shaft 9, the latter is rigidly mounted with the arm 13. In particular, the mounting is performed by means of a flat section 20 of the shaft 9 cooperating with the flat section 18 of the inner surface of the opening 17 of the arm 13. The pin 54 provided on the arm 13 is advantageously intended to come into contact with the first finger 25 that the rocker 6 comprises. By pivoting the arm 13, the pin 54 abuts against the first finger 25 thus causing the rotation of the rocker 6.

In order that the arms 13 and/or the first 2 and second 4 structures continue their pivoting toward the fully-open position, it can be provided that the pin 54 consists of a flexible blade. The latter would allow the disengagement of the arm 13 of the rocker 6 beyond the predetermined pivoting angle α of the arm. Of course, other solutions can be considered so that the disengagement of the arm 13 and the rocker 6 is performed.

The predetermined pivoting angle α of the arm 13 corresponds to a predetermined pivoting angle β of the rocker 6 which is comprised between 10 and 30° (illustrated in FIG. 4). Preferably, the predetermined pivoting angle β of the rocker 6 is in the order of 24°. More precisely, the predetermined pivoting angle β of the rocker 6 corresponds to an intermediate open state of the first 2 and second 4 structures, and/or the arms 13, where the separation of said structures 2, 4 is in a manner substantially parallel. The intermediate open state of the first 2 and second 4 structures then exhibits a separation comprised between 30 and 60 mm. Preferably, this separation is of 40 mm.

The rocker 6 comprises on its second end 8 a means for interacting with the measuring means.

More precisely, the second end 8 of the rocker 6 can comprise on its inner face 51 a second finger 26 intended to set a connection between the rocker 6 and an actuating means 60 for actuating the measuring means 10.

The measuring means 10 can comprise, for example, a potentiometer 27, a strain gauge, an optical detection system 29 with a photodetector or an electromagnetic detection system. The measuring means 10 is preferably installed in one of the rear feet 45 to avoid temperature variations.

In the embodiment comprising the potentiometer 27, the latter includes a body 59 and a cavity 36 opening into the body 59. The potentiometer 27 also includes a lever 30 driven by the second finger 26 of the rocker 6, between the closed state and the intermediate open state of the first 2 and second 4 structures.

Advantageously, the measuring means 10 also comprises a biasing means 32.

In particular, the lever 30 exhibits a distal end 31 that can be biased by the biasing means 32 which holds the rocker 6 and the lever 30 in contact, at the second finger 26, during the separation movement of the second structure 4 for example, or the movement of the arms 13. The biasing means 32 can be fixed by one of its ends 33 to the frame of the appliance 1 and by the other of its ends 33 to a passage 52 that the distal end 31 of the lever 30 can comprise.

The lever 30 also includes a proximal end 34 fitted with a head 35 which is intended to be engaged in the cavity 36 of the potentiometer 27. The lever 30 is movable in rotation along an angle γ comprised between 0° and 65°. The lever can include a length of about 20 mm.

According to another alternative of this embodiment as illustrated in FIGS. 15 to 19, the measuring means 10 comprises the potentiometer 27. The latter includes a toothed wheel 58 installed inside the body 59 of the potentiometer 27. However, a portion of the toothed wheel 58 remains accessible out of the body 59. More precisely, the toothed wheel is driven by a rack 58 that the end 8 of the rocker 6 comprises. The teeth of the wheel can be disposed over all or part of the periphery thereof. The biasing means 32 can be housed inside the body 59 of the potentiometer to hold the rocker 6 and the lever 30 in contact during the separation movement of the second structure 2.

The biasing means 32 can comprise a first 61 and a second 62 biasing elements. The first biasing elements 61 can be housed in the measuring means 10, for example in the body 59 of the potentiometer 27 and/or the second biasing element 62 can be fixed on the one hand to the frame and on the other hand to the distal end 31 of the lever 30.

This biasing means 32 allows returning the rocker 6 when it is released upon the complete opening of the appliance 1 and overcoming the problem of clearance related to the manufacture. Preferably, it consists of a tension spring and/or a spiral spring.

The potentiometer 27 can be used without limitation. It can exhibit an angular range varying from 0 to 90°, from 0 to 120° or even from 0 to 360°. It can be provided that the potentiometer 27 is equipped with a built-in, an offset or an integrated printed circuit.

In the embodiment comprising the strain gauge 28 illustrated in FIGS. 10A and 10B, the latter is disposed, for example on a wall 37 of the rear foot 45. The second end 8 of the rocker 6 includes a housing with an opening 38 in which is housed a needle 39 passing through the opening 38 when the rocker 6 pivots. The needle 39 is mounted on a spring 40 and acts on the strain gauge 28.

On FIG. 11, there is schematically represented an example of optical detection system 29 with a photodetector comprising a LED 41 and a photodetector 42 disposed for example away from the frame, inside the foot 45. A reflecting element 43 can be mounted on the second end 8 of the rocker 6 to reflect the light ray toward the photodetector 42, thereby allowing to estimate the thickness of the food.

Concerning the electromagnetic elements provided for the measuring means, these can consist, for example, of a Hall-effect sensor.

Thanks to the arrangement of the measuring device 12, it might be possible to establish an amplification ratio of the pivoting angle β of the rocker (or the angle of the lateral arm 13) greater than 3 to allow differentiating thicknesses of food at +/−1 mm. This ratio can be written as follows:

$$R_{amplification} = \frac{L_{rocker}}{L_{lever}} = \frac{\beta_{lever}}{\alpha_{rocker}} > 3$$

In order to optimize the achieved results so that they are accurate and for a better cooking of the food, there can be provided a calibration or sizing of the appliance 1 in factory, after manufacture. For more accuracy, the calibration consists in measuring the same quantity with the appliance with gauge blocks.

For example, a first gauge block intended to simulate a food thickness can be installed between the first 2 and second 4 structures so as to obtain a first value, called first point. The first block can exhibit a thickness of about 2 mm.

A second gauge block is then disposed between the first 2 and second 4 structures in order to obtain a second value, called second point. The second block can exhibit a thickness of about 30 mm.

These first and second points will allow determining, through different simulations, the uncertainties related to the measurements performed by the appliance 1 during calibration and, of course, correcting them.

When the appliance is sold and ready operate, a user can use it as follows:

Turning-on of the appliance 1 by pressing, for example, an on/off button or key of an interface 44 that the appliance 1 exhibits. The latter can be for example turned on, by plugging a power cord that it comprises in order to connect it to the mains.

If provided, selection of the type of food by means of the interface 44.

If still provided, selection of a desired cooking degree of the food. Otherwise, there can be provided a determination, by the appliance 1, of the cooking temperatures depending on the food.

If still provided, automatic determination of the preheat temperature of the appliance 1.

Opening of the appliance. This step can be performed at any time of the aforementioned steps.

Setting up of the food.

Closure of the appliance 1 by lowering the second structure 4 and/or the lateral arms 13 above the food.

This step will allow the appliance 1 to perform the measurements of thickness of the food then disposed between the first 2 and second 4 structures, and will allow, for example, activating the beginning of the cooking of the food. Said thickness measurement is automatically obtained by the pivoting angle β of the rocker 6. The latter allows determining the separation between the first 2 and second 4 structures in order to estimate the thickness of the food.

At the end of the cooking of the food, the user can retrieve the food or keep it warm between the structures 2, 4.

The appliance can be turned off by selecting the on/off key or be unplugged.

The interface 44 can exhibits different keys or buttons allowing to access a menu or a touch screen.

To ensure that the mechanical and/or electronic system of the appliance 1 operates in an optimal manner and to compensate all errors and uncertainties that appear due to several uses and/or ageing of the appliance 1, it can be provided that the user performs an automatic adjustment of the appliance 1. This adjustment is preferably performed with the grill closed. It is intended to reset the measuring device 12 to an operating state appropriate for its use. For example, in the case where the grill is closed, the device is reset to 0, value indicating that there is no food thickness in the appliance 1.

For example, the user can, before use, press an adjustment key or set a combination of keys to achieve the adjustment.

The invention claimed is:

1. A cooking appliance comprising:
   a first structure including a heating plate for cooking a food; and,
   a measuring device for measuring the thickness of the food thus disposed and comprising:
   a pivoting rocker connected at a first end to a pivotable shaft; and,
   a means for measuring the pivoting angle of the rocker to estimate the thickness of the food;
   wherein the appliance comprises a second movable structure of which a separation movement relative to the first structure generates a pivoting of said shaft relative to the first structure, resulting in the pivoting of the rocker, and the measuring means interacts with the rocker toward a second end thereof.

2. The appliance according to claim 1, wherein the second structure comprises a heating plate adapted to cook there against, by conduction, said food disposed between the plates.

3. The appliance according to claim 1, wherein the rocker is rigidly connected to the pivotable shaft.

4. The appliance according to claim 1, wherein the rocker is mounted on the shaft with a clearance sufficient to allow the pivoting of the rocker.

5. The appliance according to claim 1, wherein the second structure is mounted on the shaft by means of lateral arms movable at least relative to the first structure.

6. The appliance according to claim 5, wherein each lateral arm comprises a first end connected to the shaft and a second portion connected to a flank of the second structure toward a middle of said flank.

7. The appliance according to claim 5, wherein the rocker includes a first end engaged with a first end of one of the lateral arms where the arm is connected to the shaft, this engagement operating until a predetermined pivoting angle of the arms beyond which said arm disengages from the rocker, so that the lateral arms then continue their pivoting without the rocker continuing to pivot.

8. The appliance according to claim 7, characterized in that the predetermined pivoting angle of the arms corresponds to a predetermined pivoting angle ($\beta$) of the rocker which is comprised between 10° and 30°.

9. The appliance according to claim 7, wherein the predetermined pivoting angle ($\beta$) of the rocker corresponds to an intermediate open state of the first and second structures where said first and second structures are substantially parallel.

10. The appliance according to claim 1, wherein the rocker is connected, toward its second end, to an actuating means for actuating the measuring means.

11. The appliance according to claim 1, wherein the measuring means comprises a potentiometer (27).

12. The appliance according to claim 10, wherein the rocker comprises first and second fingers, the actuating means comprises a lever driven by the second finger of the rocker and biased by a biasing means which holds the rocker and the lever in contact during the separation movement of the second structure.

13. The appliance according to claim 10, wherein the actuating means comprises a toothed wheel driven by a rack of the rocker and biased by at least one biasing means which holds the rocker and the toothed wheel in contact during the separation movement of the second structure.

14. The appliance according to claim 1, wherein the measuring means comprises one of a strain gauge or an optical detection system with a photodetector.

15. A method for implementing the appliance according to claim 1, the appliance comprising a first structure including a heating plate for cooking the food, wherein the method comprises a step of adjusting the appliance, before use, through the selection by the user of a key or a combination of keys that the appliance comprises.

* * * * *